(12) United States Patent
Cheng

(10) Patent No.: US 8,854,375 B2
(45) Date of Patent: Oct. 7, 2014

(54) METHOD AND SYSTEM FOR GENERATING GRAY DOT-MATRIX FONT FROM BINARY DOT-MATRIX FONT

(75) Inventor: Kuo-Young Cheng, Taichung Hsien (TW)

(73) Assignee: DynaComware Taiwan Inc., Taipei (TW)

( * ) Notice: Subject to any disclaimer, the term of this patent is extended or adjusted under 35 U.S.C. 154(b) by 450 days.

(21) Appl. No.: 12/907,732

(22) Filed: Oct. 19, 2010

(65) Prior Publication Data

US 2012/0092344 A1    Apr. 19, 2012

(51) Int. Cl.
G06T 11/00    (2006.01)
G06T 11/20    (2006.01)

(52) U.S. Cl.
CPC .................................. G06T 11/203 (2013.01)
USPC ......................................................... 345/467

(58) Field of Classification Search
None
See application file for complete search history.

(56) References Cited

U.S. PATENT DOCUMENTS

| | | | | |
|---|---|---|---|---|
| 5,852,448 | A | 12/1998 | Cheng | 345/469 |
| 6,151,032 | A | 11/2000 | Cheng | 345/469 |
| 6,157,390 | A | 12/2000 | Cheng | 345/467 |
| 6,501,475 | B1 | 12/2002 | Cheng | 345/467 |
| 6,529,197 | B1 * | 3/2003 | Ballard et al. | 345/468 |
| 6,542,161 | B1 * | 4/2003 | Koyama et al. | 345/589 |
| 6,661,417 | B1 | 12/2003 | Cheng | 345/469 |
| 7,199,797 | B2 | 4/2007 | Cheng | 345/470 |
| 7,239,319 | B2 * | 7/2007 | Loop | 345/467 |
| 7,295,346 | B2 * | 11/2007 | Loce et al. | 358/2.1 |
| 2004/0196288 | A1 * | 10/2004 | Han | 345/467 |
| 2004/0214348 | A1 * | 10/2004 | Nicholson et al. | 436/518 |
| 2005/0089237 | A1 * | 4/2005 | Park et al. | 382/242 |
| 2006/0115158 | A1 * | 6/2006 | Sunshine et al. | 382/191 |
| 2006/0171589 | A1 * | 8/2006 | Jun et al. | 382/185 |
| 2006/0209092 | A1 * | 9/2006 | Iwata | 345/636 |
| 2008/0240264 | A1 * | 10/2008 | Ionescu | 375/260 |
| 2010/0189362 | A1 * | 7/2010 | Jakubiak et al. | 382/203 |
| 2011/0075940 | A1 * | 3/2011 | Deaver | 382/229 |

* cited by examiner

Primary Examiner — Aaron M Richer
Assistant Examiner — Anh-Tuan V Nguyen
(74) Attorney, Agent, or Firm — Seed IP Law Group PLLC

(57) ABSTRACT

A computer-implemented method is disclosed for transforming a binary dot-matrix font to a gray dot-matrix font. The method includes generally five steps. First, a binary dot-matrix outline shape is received, which is designed to render a binary dot-matrix character image on a binary dot-matrix display. The binary dot-matrix outline shape includes one or more curve segments. Second, the received dot-matrix outline shape and the binary dot-matrix character image that can be rendered based on the received outline shape are placed on a lattice coordinate system composed of a plurality of dots. Third, for each of the one or more curve segments, intersecting points at which the curve segment intersects with the plurality of dots in the lattice coordinate system are recorded. Fourth, an anti-aliasing operation is performed on the binary dot-matrix outline shape placed on the lattice coordinate system to obtain a target gray value for each of the dots that are intersected by the one or more curve segments. Fifth, a collection of the target gray values for all of the intersected dots are recorded as a gray dot-matrix image font.

12 Claims, 10 Drawing Sheets

$P(t) = (1-t)^2 V_1 + 2t(1-t)V_2 + t^2 C$

METHOD AND SYSTEM FOR GENERATING GRAY DOT-MATRIX FONT FROM BINARY DOT-MATRIX FONT

BACKGROUND

1. Technical Field

The present invention is directed to image processing for transforming a binary dot-matrix image to a gray dot-matrix image, and more particularly to a method and system for generating a gray dot-matrix font from an existing binary dot-matrix font.

2. Description of the Related Art

Many font generating systems exist for generating Asian character fonts ("Asian fonts"). An Asian font is composed of a large number of ideographs that represent the characters in the Asian language. Asian languages may include thousands of characters. For example, the Chinese language includes over twenty-thousand distinct characters.

One conventional computer technique for generating character patterns in an Asian font uses font outlines. This system is described in "PostScript Language Tutorial and Cookbook" by Adobe Systems, Inc. (Addison-Wesley Publishing, 1985). In this method, the outline of a character pattern is stored as a collection of straight lines and curves. There are some disadvantages associated with this technique. First, because different font outlines must be defined and stored for tens of thousands of different characters, the memory requirement is relatively high. Second, the font outlines that are stored in high resolution are suited for display only in high resolution; they are not suited for high-quality display in relatively low resolution.

Another method of generating an Asian font uses stroke-based character pattern data, wherein each stroke within a character is separately defined. A character typically consists of multiple strokes that overlap or intersect with each other. The stroke-based character data consist of key points, width values, feature points, and curve ratios, which together define the outline of each stroke. The construction and rendering of the stroke-based character data are described in detail in U.S. Pat. Nos. 5,852,448, 6,151,032, and 6,157,390, which are explicitly incorporated by reference herein. The stroke-based technique is suited for reducing the memory requirements for fonts. Further, the stroke-based character font can be adjustably displayed, always in high quality, in both high resolution and low resolution.

Yet another method of generating an Asian font uses glyph-based character pattern data, wherein each glyph within a character is separately defined. An Asian character typically consists of one or more glyphs, each of which in turn consists of one or more strokes. For example, several strokes in a character that intersect or overlap with each other often create a complicated overall geometric shape, which is a glyph. In the glyph-based technique, each glyph is defined in terms of key points, width values, feature points, and curve ratios, as in the stroke-based technique described above. The construction and rendering of the glyph-based character pattern data are described in detail in U.S. Pat. Nos. 6,501,475 and 6,661,417, which are explicitly incorporated by reference herein.

Still another method of generating a set of Asian fonts for display in gray scale is known, wherein each character comprises one or more strokes/glyphs, and each stroke/glyph is defined in silhouette-oriented representation. The construction and rendering of the silhouette-oriented representation for display in gray scale is described in detail in U.S. Pat. No. 7,199,797, incorporated by reference herein.

In a broad sense, various fonts described above, including stroke/glyph-based fonts, are all "outline fonts," in that they store or define outlines of characters or outlines of strokes/glyphs that form the characters.

Standard font engines are capable of receiving an outline font and rendering (displaying) the outline font in the form of a dot-matrix image on dot-matrix screens having various resolution levels. With the advancement of screen display technology, text can now be displayed as a gray level dot-matrix image on the screen of cellular phones, PDAs, portable digital audio/visual devices, and other electronic devices. Previously, characters were rendered on a binary dot-matrix screen, which displayed each pixel as either black or white. For example, if more than 50% of a pixel area is occupied by an outline of a character, then the pixel is activated (black), and if not the pixel is not activated (white). On the other hand, a gray level (or gray dot-matrix) screen is capable of displaying each pixel at any gray level (or gray value) ranging from black (0) through white (255). Briefly, a typical method of rendering a character on a gray level screen entails, for each display pixel onto which the character falls, determining what portion of each pixel is occupied by the character. Specifically, the method determines an area A1 occupied by the character and an area A2 unoccupied by the character, wherein A1+A2=total area of 1 pixel. Then, the gray value for the pixel can be calculated as follows:

$$\text{Gray Value} = (A1 \times \text{black} + A2 \times \text{white})/(A1+A2) \quad \text{(Eq. 1)}$$

Various other calculation methods exist for obtaining a gray value for a particular pixel.

However, rendering those font characters that are originally defined for a binary dot-matrix screen on a gray dot-matrix screen often causes severe degradation of the resulting text image. This is particularly true with Asian characters, which tend to have relatively more complicated overall geometric shapes.

Some software tools have been developed to help the construction of a gray dot-matrix font from an existing binary dot-matrix font. One example is an interactive man-machine interface software tool, which accepts an existing binary dot-matrix image font that is formed as a collection of dots, and generates a corresponding outline font which, when input to a standard font engine, generates (displays) a character image on a binary dot-matrix screen that is substantially the same as the original binary dot-matrix image. The tool then allows a font designer to modify the generated outline font shape manually to generate a new outline font that is suited for rendering a gray dot-matrix character image on a gray dot-matrix screen. Basically, a tool of this kind allows a font designer to first construct an outline font shape based on an existing binary dot-matrix image font, and then to modify the constructed outline font shape as a reference shape to obtain a gray dot-matrix outline font which, when input to a font engine, produces a gray dot-matrix character image on a gray dot-matrix screen. However, this approach is labor intensive and time consuming.

A need exists for a method and system for automatically or semi-automatically transforming a binary dot-matrix font to a gray dot-matrix font.

BRIEF SUMMARY

This summary sets forth various aspects of the invention and is not intended to limit the boundary of the claims for the invention.

According to one aspect of the invention, a computer-implemented method is provided for transforming a binary dot-matrix font to a gray dot-matrix font. The method includes generally five steps. First, a binary dot-matrix outline shape is received, which is designed to render a binary dot-matrix character image on a binary dot-matrix display. The binary dot-matrix outline shape includes one or more curve segments. Second, the received dot-matrix outline shape and the binary dot-matrix character image that can be rendered (produced) based on the received outline shape are placed on a lattice coordinate system composed of a plurality of dots. Third, for each of the one or more curve segments of the outline shape, intersecting points between the curve segment and the dots in the lattice coordinate system are identified and recorded. Fourth, an anti-aliasing operation is performed on the binary dot-matrix outline shape placed on the lattice coordinate system to obtain a target gray value for each of the dots that are intersected by the one or more curve segments. Fifth, a collection of the target gray values for the intersected dots, obtained above, are recorded as a gray dot-matrix image font.

According to another aspect of the invention, the computer-implemented method includes generally three additional steps. Sixth, the intersecting points are moved in the lattice coordinate system to achieve the target gray value for each of the intersected dots. Seventh, approximated Bezier curve segments are obtained, which follow the moved intersecting points. Eighth, a collection of the approximated Bezier curve segments are recorded as a gray dot-matrix outline font.

Thus, the method may be used to produce either or both of a gray dot-matrix image font, which is a collection of dots that together form a character image, and a gray dot-matrix outline font, which is a collection of curve segments that define an outline of a character image.

According to a further aspect of the invention, a computer-readable medium is provided that contains computer-executable instructions which, when loaded onto a computing system, carry out various functions according to a method of the invention of transforming a binary dot-matrix font to a gray dot-matrix font.

According to yet another aspect of the invention, the transformation from a binary dot-matrix font to a gray dot-matrix font can be carried out fully automatically or semi-automatically with some human (user) intervention. To facilitate semi-automatic transformation, a computer-readable medium containing a computer graphical user interface software tool is provided, which causes a screen of a computing system to display a working area, an instruction area, and a display area. The working area is configured to display a binary dot-matrix character image on a lattice coordinate system, and to further display a corresponding binary dot-matrix outline shape as overlaid on the binary dot-matrix character image. The interactive instruction area is configured to receive a user instruction to modify information displayed in the working area. The display area is configured to display a gray dot-matrix character image that results from the information displayed in the working area and modified by the user. Thus, the user can selectively intervene in the transformation process through the instruction area, while visually confirming a resulting gray dot-matrix character image in the display area.

DETAILED DESCRIPTION

Figure 1A:
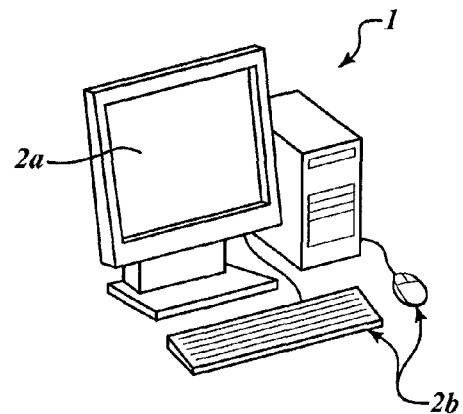
FIG. 1A depicts a system or graphical computer user interface tool product suitable for embodying, or practicing a method of, the present invention according to its various embodiments.

FIG. 1A illustrates a typical computing environment, in which various methods and systems of the present invention may be implemented. A general purpose digital computer 1, including a display 2a and an input device 2b (e.g., mouse and keyboard), is fully capable of carrying out various methods or incorporating various systems of the present invention. The display 2a and any other output devices (printer, monitor, drive mechanism, etc.) may display, print, and otherwise output the font generated in accordance with the present invention as well as any intermediate products/data formed during the transformation of a binary dot-matrix font into a gray dot-matrix font. Other types of computing systems, such as networked or mainframe-based systems, may also be used, as will be apparent to those skilled in the art.

Figure 1B:
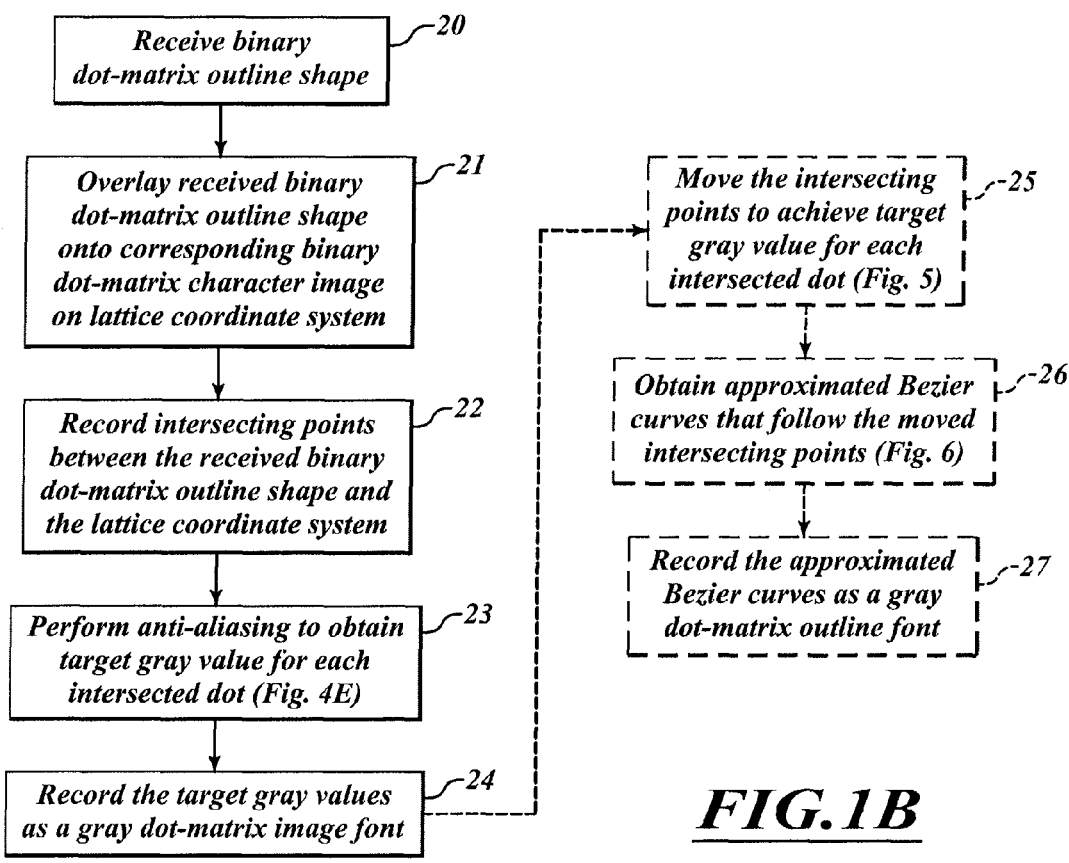
FIG. 1B is a flowchart illustrating a method of transforming a binary dot-matrix font to a gray dot-matrix font according to various embodiments of the present invention.
Figure 2A:
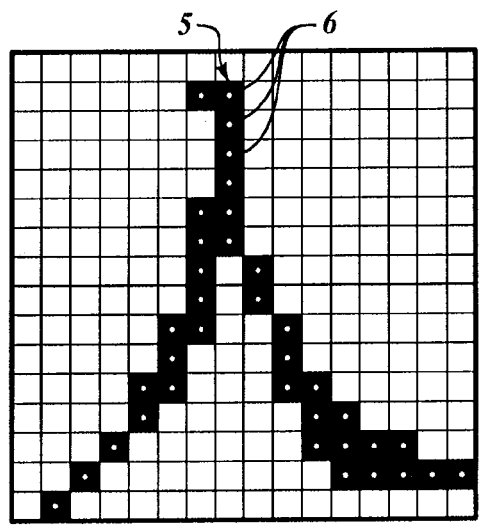
FIG. 2A shows a binary dot-matrix character image on a lattice coordinate system.
Figure 2B:
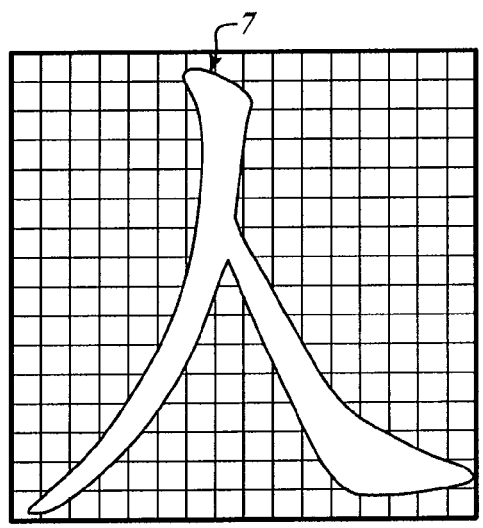
FIG. 2B shows a corresponding binary dot-matrix outline shape.

FIG. 1B is a flowchart illustrating an exemplary method of transforming a binary dot-matrix font into a gray dot-matrix font according to various embodiments of the present invention. In Block 20, the method receives a binary dot-matrix outline shape that is designed to produce a binary dot-matrix character image on a binary dot-matrix screen. Referring additionally to FIGS. 2A and 2B, a binary dot-matrix outline shape 7, typically defined in the form of a binary dot-matrix outline font, generates the binary dot-matrix character image 5 of FIG. 2A when the binary dot-matrix outline font is input to a standard font engine. The binary dot-matrix outline shape 7 includes one or more curve segments, such as a curve segment 8 that defines a left-hand side curve of the outline shape 7 as shown in FIG. 2C.

Figure 2C:
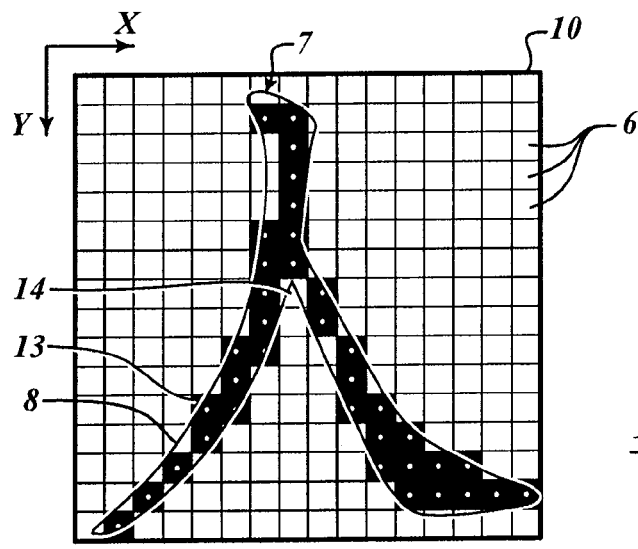
FIG. 2C shows the outline shape of FIG. 2B superposed on the character image of FIG. 2A.

In Block 21, the received dot-matrix outline shape 7 and the binary dot-matrix character image 5 that is rendered based on the dot-matrix outline shape 7 are both placed on a lattice coordinate system 10, as shown in FIG. 2C. In other words, the binary dot-matrix outline shape 7 is superposed on the binary dot-matrix character image 5 on the lattice coordinate system 10. The lattice coordinate system 10 consists of a plurality of dots (pixels) 6 that are arranged in a lattice to form a coordinate system. Typically, the dots 6 are defined by vertical and horizontal lines such that each dot is generally of a square shape defined by four sides—2 vertical sides and 2 horizontal sides.

In general, a standard font engine can render a binary dot-matrix character image based on a binary dot-matrix outline shape. FIG. 2C shows one rendering example, which uses the following two rules: (i) if an outline (or an area enclosed within an outline) covers/occupies more than 50% of the area of a dot (pixel), then the dot is activated and assigned black, else the dot is not activated and assigned white; and (ii) if a dot receives two curve segments of an outline that are facing each other, then the dot is activated and assigned black.

Figure 3A:
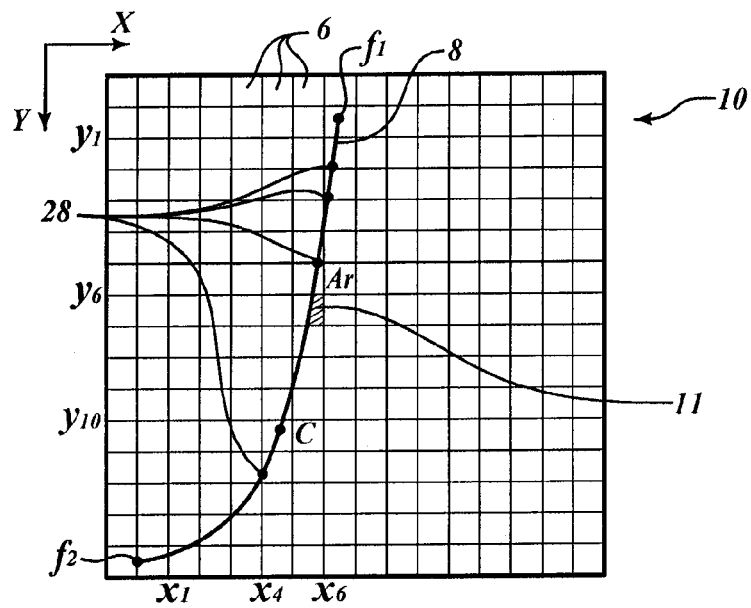
FIG. 3A illustrates intersecting points between a curve segment of a binary dot-matrix outline shape and the lattice coordinate system.

In Block 22, referring additionally to FIG. 3A, for each curve segment 8 of the binary dot-matrix outline shape 7, intersecting points 28 are identified at which the curve segment 8 intersects with the sides (2 vertical sides and 2 horizontal sides) of the dots 5 in the lattice coordinate system 10. Specifically, the positional coordinates of each intersecting point (i.e., which curve segment intersects with which dot at which location) are identified, as well as the intersecting status of each intersecting point (i.e., whether the curve segment 8 intersects with a vertical side or a horizontal side of each dot), as will be more fully described below.

Figure 3B:
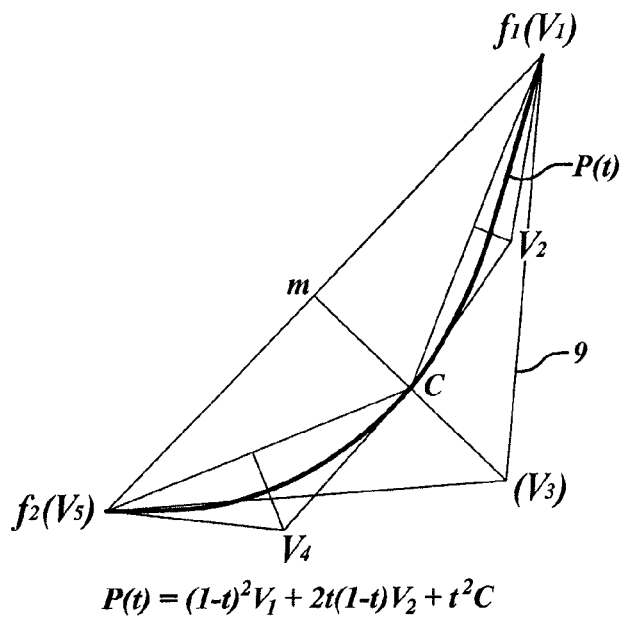
FIG. 3B illustrates a well-known tree-structured Bezier curve suitable for defining the curve segment of FIG. 3A.

The curve segment 8 of the received binary dot-matrix outline shape 7 is typically defined as a tree-structured Bezier curve well known in the art. FIG. 3B illustrates a tree-structured Bezier curve constructed to define the curve segment 8 of the binary dot-matrix outline shape 7. Referring both to FIGS. 3A and 3B, the curve segment 8 is initially defined by two feature points ($f_1$ and $f_2$) placed at two end points, respectively, using a well-known tree-structured Bezier curve construction method. The Bezier curve construction method begins with constructing a binary Bezier curve that approximates the curve segment 8 based on a control triangle 9, which will be at the root of the tree structure. The control triangle 9 is formed with a line connecting feature points $f_1$ and $f_2$ as a bottom line, and a line connecting vertex $V_3$ to the center point "m" of the bottom line as the center line of the triangle. The control triangle 9 ($f_1$-$V_3$-$f_2$) is then used to define a binary Bezier curve, which passes the center point "C" of the center line and which is tangent to both of the triangle sides, ($f_1$-$V_3$) and ($V_3$-$f_2$), at the feature points $f_1$ and $f2$, respectively. By moving the vertex $V_3$ of the control triangle 9, a Bezier curve that ideally approximates the actual curve segment 8 can be obtained. If the approximated Bezier curve constructed in this manner does not fit the curve segment 8 well, then the Bezier curve can be split at the center point "C" of the center line into two segments, and the same process is repeated for each segment to form yet another (second-order) Bezier control triangle that approximates the split curve segment. Specifically, in the illustrated example of FIG. 3B, two further control triangles, ($f_1$-$V_2$-C) and (C-$V_4$-$f_2$), are formed, based on which two second-order Bezier curves are defined. Thus, a Bezier tree structure with a root branching into two leaf nodes is formed, which approximates the curve segment 8 of the binary dot-matrix outline shape 7. In the illustrated embodiment, one of the second-order Bezier curves based on the control triangle ($f_1$-$V_2$-C) is defined as:

$$P(t) = (1-t)^2 V_1 + 2t(1-t)V_2 + t^2 C \qquad \text{(Eq. 2)}$$

In various embodiments of the present invention, the binary dot-matrix outline shape 7 is received in the form of a collection of tree-structured Bezier curve segments, each approximating a curve segment 8 defined between two consecutive (adjacent) feature points along the binary dot-matrix outline shape 7. Thus, the curve segment 8, including the curve sub-segment ($f_1$-C) defined in (Eq. 2) above, is received as an input to a system and method of the present invention.

Still referring to FIGS. 3A and 3B, the curve sub-segment ($f_1$-C) intersects the dots (or pixels) at vertical sides $x_6$ and $x_5$ and horizontal sides $y_1, y_2, \ldots y_{10}$ of the lattice coordinate system 10. In the present description, a point intersecting a vertical side $x_i$ of a dot is called a vertical intersecting point $x_i$ of the dot, and a point intersecting a horizontal side $y_i$ of a dot is called a horizontal intersecting point $y_i$ of the dot. In the illustrated embodiment, the curve sub-segment ($f_1$-C) intersects with the lattice coordinate system 10 at twelve intersecting points: (1) $y_1$, (2) $y_2$, (3) $y_3$, (4) $x_6$, (5) $y_4$, (6) $y_5$, (7) $y_6$, (8) $y_7$, (9) $y_8$, (10) $x_5$, (11) $y_9$, (12) $y_{10}$, in the order starting from the feature point $f_1$ and ending at the center point "C." These intersecting points, together with the starting point $f_1$ and the ending point "C," form the sample points of the curve sub-segment ($f_1$-C), which satisfy the following formula:

$$P(t) = \begin{bmatrix} x(t) \\ y(t) \end{bmatrix} = (1-t)^2 V_1 + 2t(1-t)V_2 + t^2 C, \; t \in [0, 1] \qquad \text{(Eq. 3)}$$

where the location of $V_1$, $V_2$, and C are known. Thus, the value t corresponding to each of these 12 intersecting points can be calculated from the above formula, i.e., using and solving x(t) formula for the vertical intersecting points $x_i$ (e.g., $x_6 = (1-t_4)^2 V_{1X} + 2t_4(1-t_4)V_{2X} + t_4^2 C_X$; $x_5 = (1-t_{10})^2 V_{1X} + 2t_{10}(1-t_{10})V_{2X} + t_{10}^2 C_X$), where $t_i$ is the i-th "t" (i=1 . . . 12) in the order starting from the feature point $f_1$ to the center point "C" in the illustrated embodiment. Similarly, $t_i$ can be determined by using and solving y(t) formula for the horizontal intersection points $y_i$ (e.g., $y_1 = (1-t_1)^2 V_{1Y} + 2t_1(1-t_1)V_{2Y} + t_1^2 C_Y$). Thus, $t_i(t_1, t_2, \ldots t_{12})$ can be obtained, and the location of each of the intersecting points ($y_1, y_2, y_3, x_6, y_4, y_5, y_6, y_7, y_8, x_5, y_9, y_{10}$) can be identified by entering their respective $t_i$ into (Eq. 3). The locations of the intersecting points are then recorded. Also, the intersecting status of each intersecting point, that is, whether it is a vertical or horizontal intersecting point, is recorded. This may be done, for example, by attributing $t_i$ ($t_1, t_2, \ldots t_{12}$) as either vertical or horizontal. As will be described later, the location and status of each intersecting point will be used to define the boundary for the movement of each intersecting point during transformation of a binary dot-matrix font to a gray dot-matrix font.

At this time, for each curve segment that forms the binary dot-matrix outline shape 7, the location and intersecting status of each of the intersecting points between the curve segment and the lattice coordinate system 10 have been recorded. No change has been made to the original binary dot-matrix outline shape 7 or to the binary dot-matrix character image 5.

Next, in Block 23, an anti-aliasing (edge-smoothing) algorithm is applied to the binary dot-matrix character outline shape 7 on the lattice coordinate system 10 to generate a gray dot-matrix image font, in which jaggedness in the resulting character image is reduced. As used herein, a gray dot-matrix image font is a font in the form of a collection of dots (or activated/black dots) which, when input to a font engine, can display a gray dot-matrix character image on a gray dot-matrix screen. As discussed above, a standard font engine can also accept a gray dot-matrix outline font in the form of a collection of curve segments that together define a character outline. In general, a gray dot-matrix outline font has less storage space requirement than a gray dot-matrix image font.

Also, an outline font is more scalable to be rendered on various dot-matrix screens having various resolution levels, unlike an image font that is typically rendered on a screen having the same resolution level as that used in the original definition of the image font. Therefore, according to various embodiments of the present invention, a binary dot-matrix font is first transformed into a gray dot-matrix image font, which may then be used as a final product or, alternatively, used to be further transformed into a gray dot-matrix outline font.

Figures 4A, 4B:
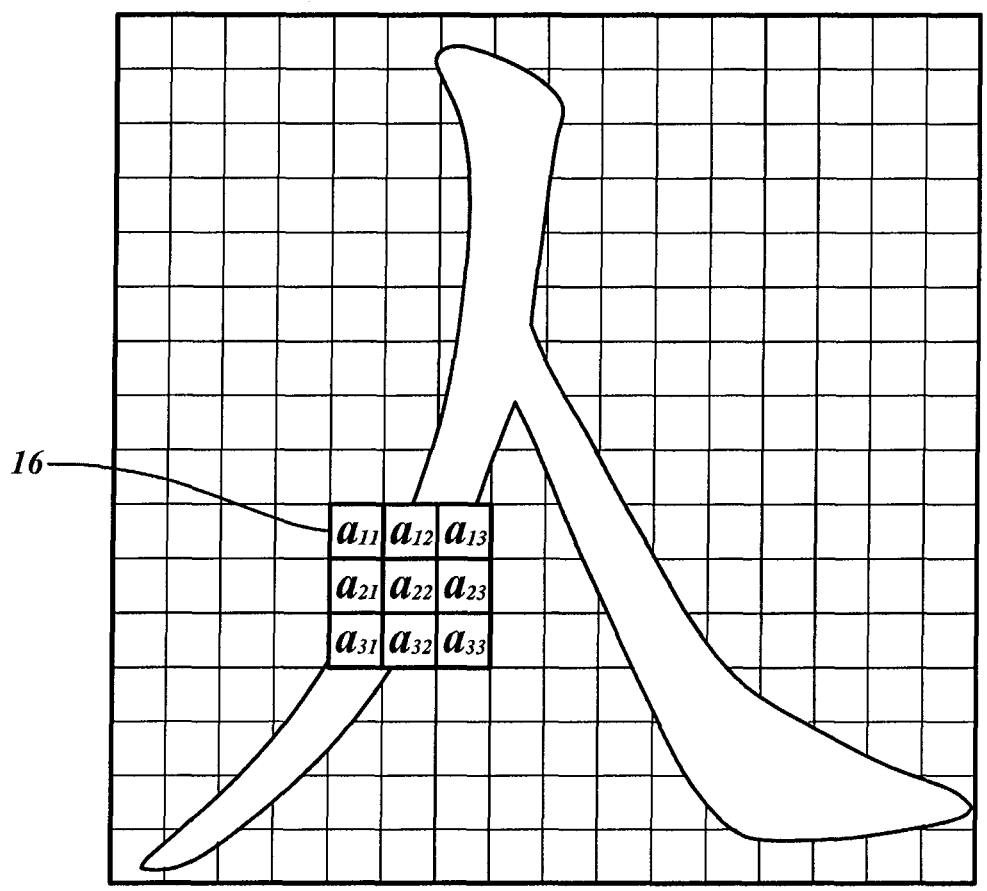
FIGS. 4A-4D illustrate construction of a Gaussian operator suitable for use in an anti-aliasing process.
Figure 4C:
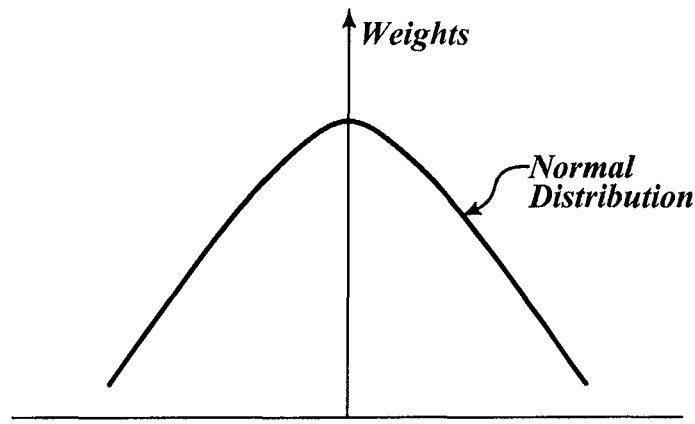
Figure 4D:
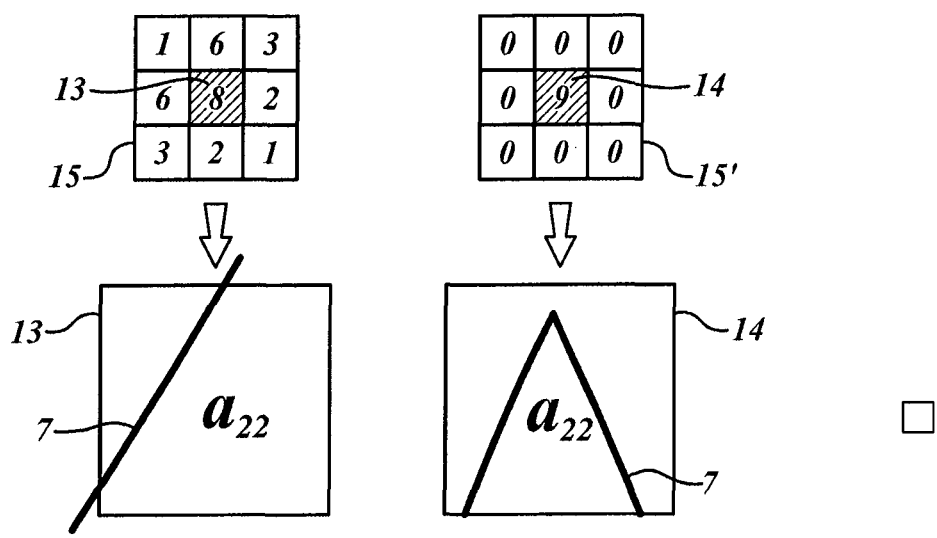
Figure 4E:
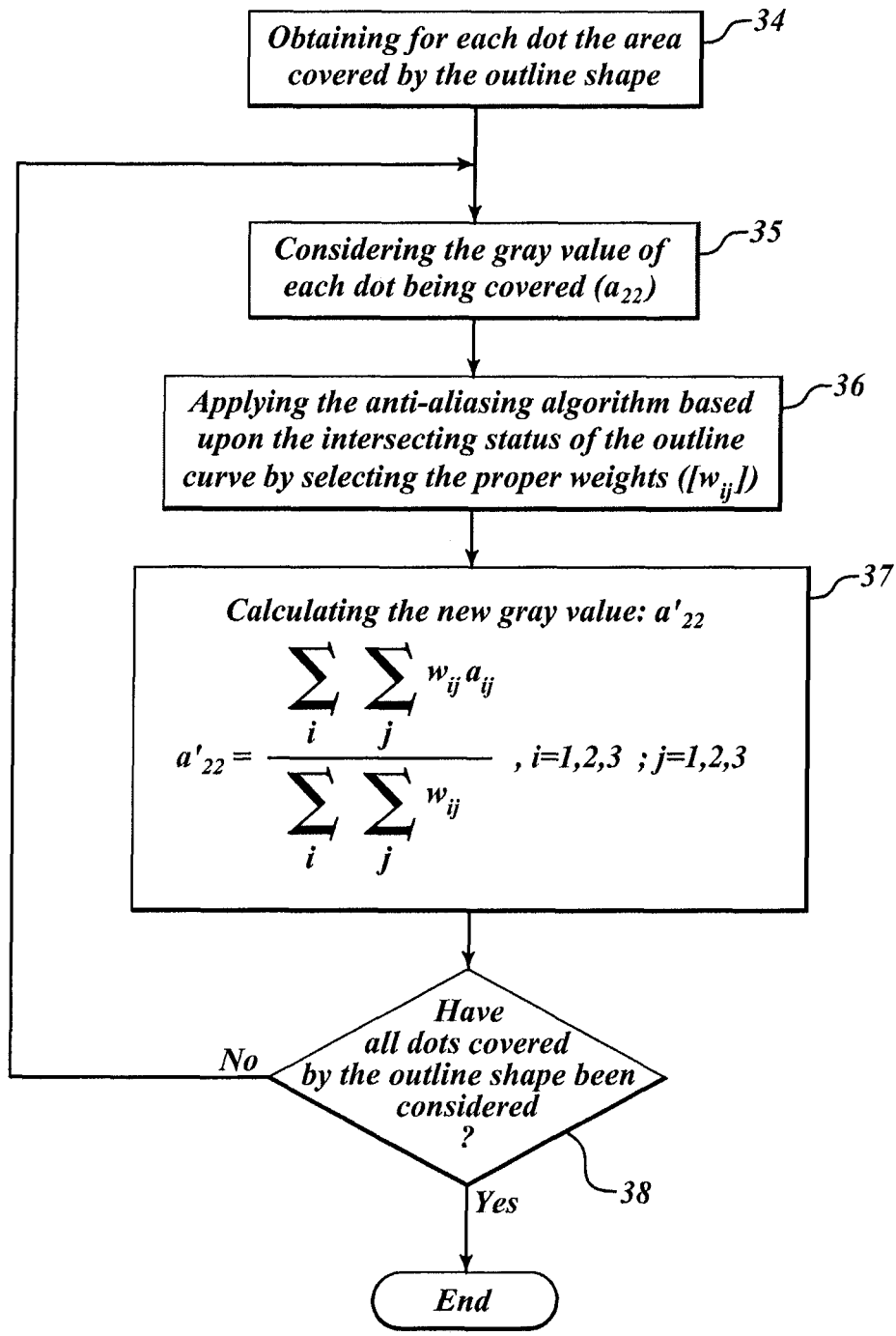
FIG. 4E is a flowchart illustrating a process of anti-aliasing using a Gaussian operator to obtain a target gray value for each intersected dot.

FIG. 4E is a flowchart illustrating a process of applying an anti-aliasing algorithm to the binary dot-matrix outline shape 7 using a Gaussian operator, according to various exemplary embodiments of the present invention.

In Block 34, a covered area of each dot that is intersected by one or more curve segments forming the binary dot-matrix outline shape 7 (herein called "intersected dot") is calculated. Also, for each intersected dot, eight dots surrounding the intersected dot (in a 3×3 window) are identified, regardless of whether those dots are intersected or not, and a covered area of each surrounding dot is calculated. If any of the surrounding dots are not intersected, then a covered area of such a dot is 0.

As discussed in the background section above, the covered area of each dot is then used to obtain a ratio of the covered area to the total dot (pixel) area (or to an uncovered area within the dot) and hence to obtain a gray value (0-255) for the dot, using any suitable gray value calculation equation such as (Eq. 1) above. It should be noted that a covered area can be directly or indirectly used as a gray value because the total area of each dot (pixel) is constant and known. For example, in some embodiments, a covered area value can be directly used as a gray value, while in other embodiments a covered area value is used to obtain a ratio of the covered area to the total dot area, which is then used to obtain a gray value.

Figure 3C:
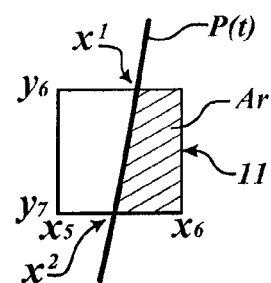
FIG. 3C is an enlarged view of a dot in the lattice coordinate system of FIG. 3A.

One example of calculating a covered area of an intersected dot is described in reference to FIG. 3C, which is an enlarged view of a dot (pixel) 11 of the lattice coordinate system 10 of FIG. 3A. In general, the area Ar of a dot covered (occupied) by the curve segment 8 can be calculated based on the intersecting points on the sides of the dot. For example, the area Ar of the dot 11 of FIG. 3C can be calculated from the following trapezoidal formula:

$$A_r = \{[x_6 - P(x^1, y_6)] + [[x_6 - P(x^2, y_7)]]\} * \frac{(y_7 - y_6)}{2} \quad \text{(Eq. 4)}$$

where the location of $x^1$ (i.e., $P(x^1, y_6)$, which is the X coordinate of $y_6$ horizontal intersecting point) can be obtained by substituting $t_7$ corresponding to $y_6$ (in the illustrated embodiment) into the $x(t)$ formula. Similarly, $x^2$ (i.e., $P(x^2, y_7)$) can be obtained by substituting $t_8$ corresponding to $y_7$ (in the illustrated embodiment) into $x(t)$.

While the above equation is based on a trapezoidal example, various other equations for calculating a covered area of a dot can be pre-defined depending on the topography of each type of intersected dot, such as how it is intersected by a curve segment to form what type of covered-area shape. For example, an equation can be formed for each topography that is defined by which two sides of a dot are being intersected (e.g., 2 horizontal sides, 2 vertical sides, 1 upper horizontal side and 1 left vertical side, 1 upper horizontal side and 1 right vertical side, 1 lower horizontal side and 1 left vertical side, and 1 lower horizontal side and 1 right vertical side). The trapezoidal example of FIG. 3C corresponds to the topography type wherein 2 horizontal sides are intersected. Each equation will use various known and fixed values (e.g., Y coordinates of horizontal intersecting points, $y_1, \ldots y_{10}$, and X coordinates of vertical intersecting points, $x_6, x_5$, as well as $t_i$ of each of the intersecting points) and unknown parameters (e.g., X coordinates of horizontal intersecting points, Y coordinates of vertical intersecting points, etc.) In accordance with various exemplary embodiments of the present invention, Y coordinates of horizontal intersecting points and X coordinates of vertical intersecting points are purposefully fixed to maintain the intersecting status of each intersecting point during the binary-to-gray transformation, i.e., to ensure that a horizontal intersecting point slides along the horizontal side and remains a horizontal intersecting point and a vertical intersecting point slides along the vertical side and remains a vertical intersecting point, as will be more fully discussed below. On the other hand, unknown parameters (variables) are used such that their values can be varied to move each intersecting point to thereby form a gray dot-matrix outline font, as will be also described below.

Various equations for calculating a covered area of an intersected dot are pre-defined and may be stored in a table, and a suitable equation is selected for each dot based on the analysis of the dot topography or intersecting condition using any suitable image analysis technique.

Thus, a covered area of each intersected dot is obtained. Also, for each intersected dot, eight dots surrounding the intersected dot (in a 3×3 window 16, see FIG. 4B) are identified and their respective covered areas are obtained. Some of the surrounding dots may be non-intersected dots, in which case their covered area is zero. The nine covered areas in a 3×3 window are then used to directly or indirectly obtain nine gray values $\{a_{ij}\}$ for the nine dots, respectively, where i=1,2, 3; j=1,2,3, with $a_{22}$ being the gray value for the center dot surrounded by eight dots (see FIG. 4B). However, at this time, a gray dot-matrix image that results from these gray values may not be of high quality because the binary dot-matrix outline shape 7, based on which of these gray values are obtained, was originally defined to render a character image on a binary dot-matrix screen.

Therefore, in Block 35 of FIG. 4E, an anti-aliasing algorithm is applied to the gray value of each intersected dot. Specifically, an anti-aliasing algorithm is applied to the gray value $a_{22}$ of the intersected dot, which is located at the center of 9 gray values $\{a_{ij}\}$ arranged in a 3×3 window.

Specifically, in Block 36, a suitable anti-aliasing matrix of weights ($[w_{ij}]$) is selected (FIG. 4A) and applied to each intersected dot (centered in a 3×3 window 16, FIG. 4B) to thereby obtain an adjusted (anti-aliased) gray value, or target gray value, for the dot. In general, an anti-aliasing algorithm selects and applies a certain Gaussian operator (or a matrix of weights) to each 3×3 window including an intersected dot at the center to calculate a new (target) gray value for the dot, such that the calculated target gray values along an outline shape will appear smoothly distributed.

FIG. 4A schematically illustrates a sample Gaussian operator 12 suitable for use in some embodiments of the present invention, which is a 3×3 matrix of weights (W) to be centered at the intersected dot to be treated with anti-aliasing. The matrix includes eight (8) dots surrounding the center dot, and each of the nine dots is assigned a particular weight value.

In Block 37, to obtain an anti-aliased target gray value for the central dot (pixel) within a 3×3 window, a gray value of each dot in the window 16 is multiplied by a predetermined weight W assigned to that dot in the corresponding matrix of weights. Then, a sum of all the multiplications is divided by a sum of all the weights W. Let $a_{ij}$ (i=1,2,3; j=1,2,3) be the gray value for each dot in the window. Then, the new (target) gray value of the center dot a'$_{22}$ (that is, the intersected dot to be treated with anti-aliasing) can be recalculated by applying the Gaussian operator as follows:

$$a'_{22} = \frac{\sum_i \sum_j w_{ij} a_{ij}}{\sum_i \sum_j w_{ij}}.$$ (Eq. 5)

In Block 38, the above calculation is performed for each of the intersected dots along the outline shape 7 so that each intersected dot is associated with a new (target) gray value.

The matrix (e.g., 3×3) of weights comprising a pre-defined table of nine weights ([w$_{ij}$]) is typically defined in accordance with a Gaussian distribution. In smoothing a gray dot-matrix image, the same Gaussian operator may be applied to each intersected dot, or different Gaussian operators (i.e., different 3×3 matrices of weights) may be applied to different intersected dots depending on the topography or intersecting condition of each intersected dot. In the latter case, various Gaussian operators may be pre-defined for various types of intersected dot topography (or intersecting condition) and stored. Then, one of these Gaussian operators may be selected for each intersected dot based on the analysis of the dot topography or intersecting condition using any suitable image analysis technique.

As with the equations formed to calculate a covered area of each intersected dot discussed above, the dot topography used to select a suitable Gaussian operator may be defined as, for example, which two sides of the dot are being intersected (e.g., 2 horizontal sides, 2 vertical sides, 1 upper horizontal side and 1 left vertical side, 1 upper horizontal side and 1 right vertical side, 1 lower horizontal side and 1 left vertical side, and 1 lower horizontal side and 1 right vertical side). For example, as shown in FIG. 2C, the binary dot-matrix outline shape 7 intersects with a dot 13 through its upper horizontal side and its left vertical side, and accordingly Gaussian weights should be emphasized at these two sides in order to smooth the dot 13 (located at the center in a 3×3 window) along the outline shape 7. FIG. 4D illustrates a sample Gaussian operator 15 suited to be applied to the dot 13 having this particular topography or intersecting condition. In this example, if the center dot (i.e., the intersected dot 13 in this case) is assigned a weight of "8," the adjacent dots that share the intersecting sides with the center dot, i.e., through which the outline shape 7 enters and leaves the center dot, are each assigned a weight of "6," while other adjacent dots that share sides with the center dot but are not intersected by the outline shape 7 are given a weight of "2." Further, the neighboring dots that are tangent to the outline shape 7 are assigned a weight of "3," and the remaining dots are assigned a weight of "1." Then, the new (target) gray value a'$_{22}$ of the intersected dot 13 is calculated as:

$\frac{1}{32}(a_{11} + 6a_{12} + 3a_{13} + 6a_{21} + 8a_{22} + 2a_{23} + 3a_{31} + 2a_{32} + a_{33}).$ As another example, in FIG. 2C, a dot 14 is intersected by two different curve segments both entering the dot 14 through the same (lower) horizontal side, indicating that the dot 14 is located in a crowded (busy) area. Then, the gray value for the dot 14 should remain unchanged and, at the least should not be made "darker," which would degrade an image surrounding the dot 14. Thus, for this type of dot intersected by two or more different curve segments, a Gaussian operator 15' as shown in FIG. 4D may be selected and applied, including a weight "9" assigned to the center dot and a weight "0" assigned to each of the rest of the dots. Then, the new (target) gray value a'$_{22}$ of the intersected dot 14 is calculated as:

$\frac{1}{9}(0+0+0+0+9a_{22}+0+0+0+0) = a_{22}$

That is, the gray value for this type of dot remains unchanged.

As shown in FIG. 4C, weights of any Gaussian operator should appear in a normal distribution. Assignment of weights in a Gaussian operator matrix depends on the topography of an intersected dot, to which the operator is to be applied, that is, how the dot is intersected by the outline shape 7 (e.g., how many curve segments intersect with the dot, through which side(s) the dot is intersected by each curve segment, the general extending direction of each curve segment relative to the dot, etc.) An optimal Gaussian operator for a particular type of intersected dot can be defined using various image analysis techniques and/or empirically. Various Gaussian weights matrices may be prepared, each specifically designed to be applied to an intersected dot having certain topography (or intersecting condition) and stored. Then, a suitable Gaussian operator is selected and applied to each intersected dot based on analysis of its topography (intersecting condition) using suitable image analysis techniques.

Returning to FIG. 1B, in Block 24, a collection of the target gray values for all of the intersected dots along the binary dot-matrix outline shape 7, which have been obtained by applying an anti-aliasing algorithm to each intersected dot as described above, may then be stored as a gray dot-matrix image font. The image font is in the form of a collection of dots (or activated dots) which, when input to a font engine, displays a high-quality, anti-aliased gray dot-matrix character image on a gray dot-matrix screen.

Further, the gray dot-matrix image font may be used to construct a (scalable) gray dot-matrix outline font, as will be described in reference to Blocks 25-27 of FIG. 1B below.

Figure 5:
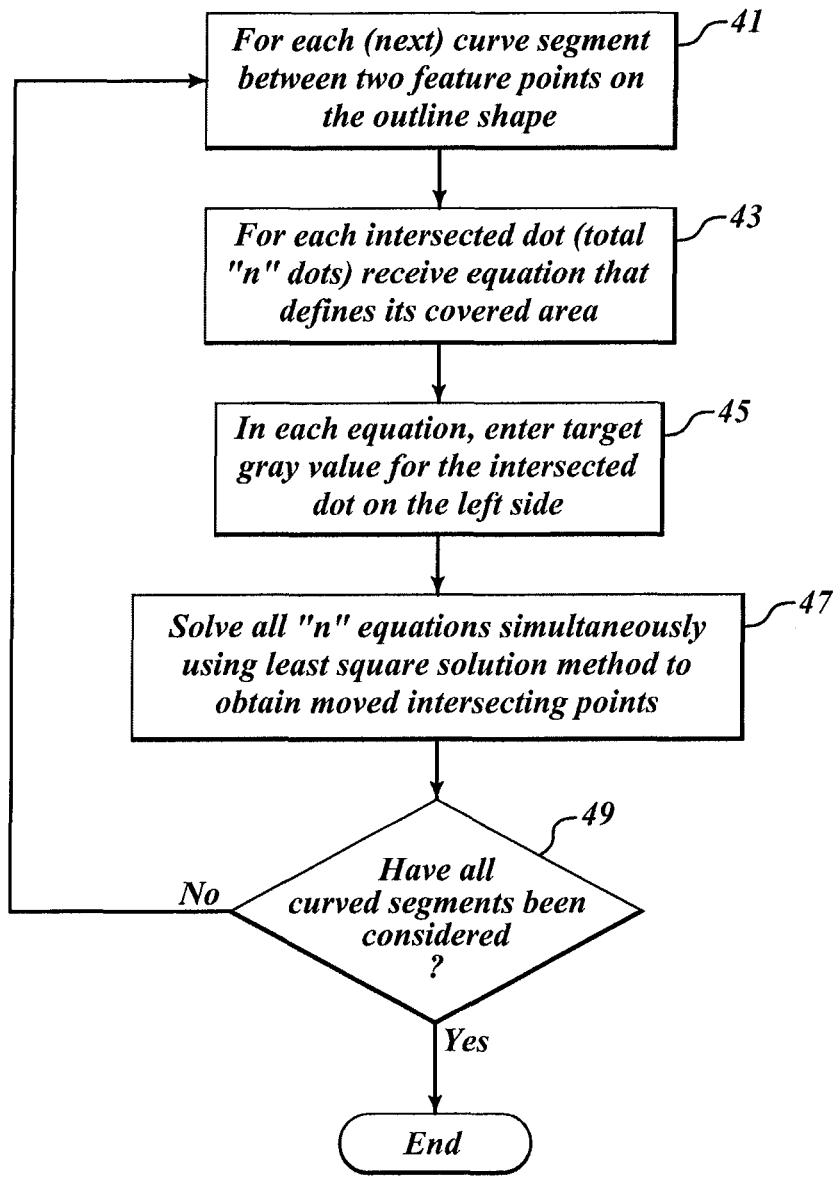
FIG. 5 is a flowchart illustrating a method of moving intersecting points to achieve the target gray value for each intersected dot.

In Block 25, the intersecting points, which are formed between the lattice coordinate system 10 and each curve segment of the binary dot-matrix outline shape 7, are moved to achieve the target gray values for all of the intersected dots along the curve segment, as calculated above in the anti-aliasing operation. For example, the intersecting points 28 of the curve segment 8 of FIG. 3A are moved, and the new locations of the moved intersecting points will be used to define a gray dot-matrix outline font, as will be more fully described below. FIG. 5 is a flowchart illustrating a method of moving intersecting points to achieve the target gray value for each intersected dot. In Block 41, one curve segment defined by two feature points at both ends (e.g., the curve segment 8 in FIG. 3A) is selected.

In Block 43, for each intersected dot (total "n" number of intersected dots) that is intersected by the selected curve segment, an equation that defines its covered area, used in Block 34 of FIG. 4E above, is retrieved or received.

For example, as shown in FIG. 3C, a trapezoidal equation is selected or retrieved for the intersected dot 11, in which a covered area forms a generally trapezoidal shape. As discussed above, each equation includes various known and fixed values (e.g., Y coordinates of horizontal intersecting points, $y_1, \ldots y_{10}$, and X coordinates of vertical intersecting points, $x_6$, $x_5$, as well as $t_i$ of each of the intersecting points) and unknown variables (e.g., X coordinates of horizontal intersection points, $y_1, \ldots y_{10}$, and Y coordinates of vertical intersecting points, $x_6$, $x_5$). For the intersected dot 11 of FIG. 3C, the equation may be formed as follows:

$$a'_{22} = \{(x_6 - x^1) + (x_6 - x^2)\} * \frac{(y_7 - y_6)}{2} \quad \text{(Eq. 6)}$$

where $x_6$, $y_6$, and $y_7$ are known, while $x^1$ and $x^2$ are unknown and variable. For each intersected dot on a curve segment, a corresponding equation that defines a covered area of the intersected dot is selected/retrieved.

In Block 45, in each equation, the target gray value $a'_{22}$ for the intersected dot, which is calculated in Block 37 of FIG. 4E above, is entered to the left-hand side (see Eq. 6 above). In this example, it is assumed that a gray value is the same as (or directly corresponding to) a covered area, though in other examples a gray value is determined indirectly from a covered area (e.g., by first obtaining a ratio of the covered area relative to the total dot area). In all examples, each equation defines a covered area of each intersected dot (on the right-hand side of the equation) that produces the target gray value for the intersected dot (on the left-hand side of the equation). In other words, each equation defines the new locations of the moved intersecting points, which define the new covered area for each intersected dot that will produce the target gray value for the intersected dot. Thus, each equation is formulated in a manner suited for solving for the new locations of the moved intersecting points (e.g., solving for $x^1$ and $x^2$ in (Eq. 6) above.) Also, each equation is suitably formulated to constrain the movement of the intersecting points, as desired. For example, Y coordinates of horizontal intersecting points, $y_1, \ldots y_{10}$, and X coordinates of vertical intersecting points, $x_6$, $x_5$, may be fixed to ensure that the intersecting status of each point remains the same, i.e., a horizontal intersecting point remains a horizontal intersecting point and a vertical intersecting point remains a vertical intersecting point. In other words, the movement of each intersecting point is limited to move along the side (horizontal or vertical) that it originally intersects with. As another example, $t_i$ may be fixed such that the new location of a moved intersecting point can be determined by the same $t_i$ as previously calculated for each of the intersecting points. Thus, the movement of each intersecting point can be constrained according to a set of rules (e.g., the intersecting status does not change, $t_i$ does not change, etc.), which are explicitly or implicitly incorporated in the equation that defines the covered area of each intersected dot to match the target gray value.

In Block 47, all of the "n" number of these equations, each defining a covered area of an intersected dot (on the right-hand side) that matches the target gray value for the intersected dot (on the left-hand side), are solved together, using for example a least square solution method. Then, all of the unknown variables are solved for, to thereby identify the new locations of the moved intersecting points. In Block 47, it is determined whether all of the curve segments that originally defined the binary dot-matrix outline shape 7 have been considered and their intersecting points moved. If not, returning to Block 41, the method is repeated until all of the curve segments' intersecting points are moved to achieve the target gray value for each of the intersected dots along the outline shape 7.

Returning to FIG. 1B, in Block 26, the moved intersecting points are next used as sample points for constructing approximated Bezier curve segments. In other words, the Bezier curve segments are constructed to fit to (or follow) the moved intersecting points as sample points.

Figure 6:
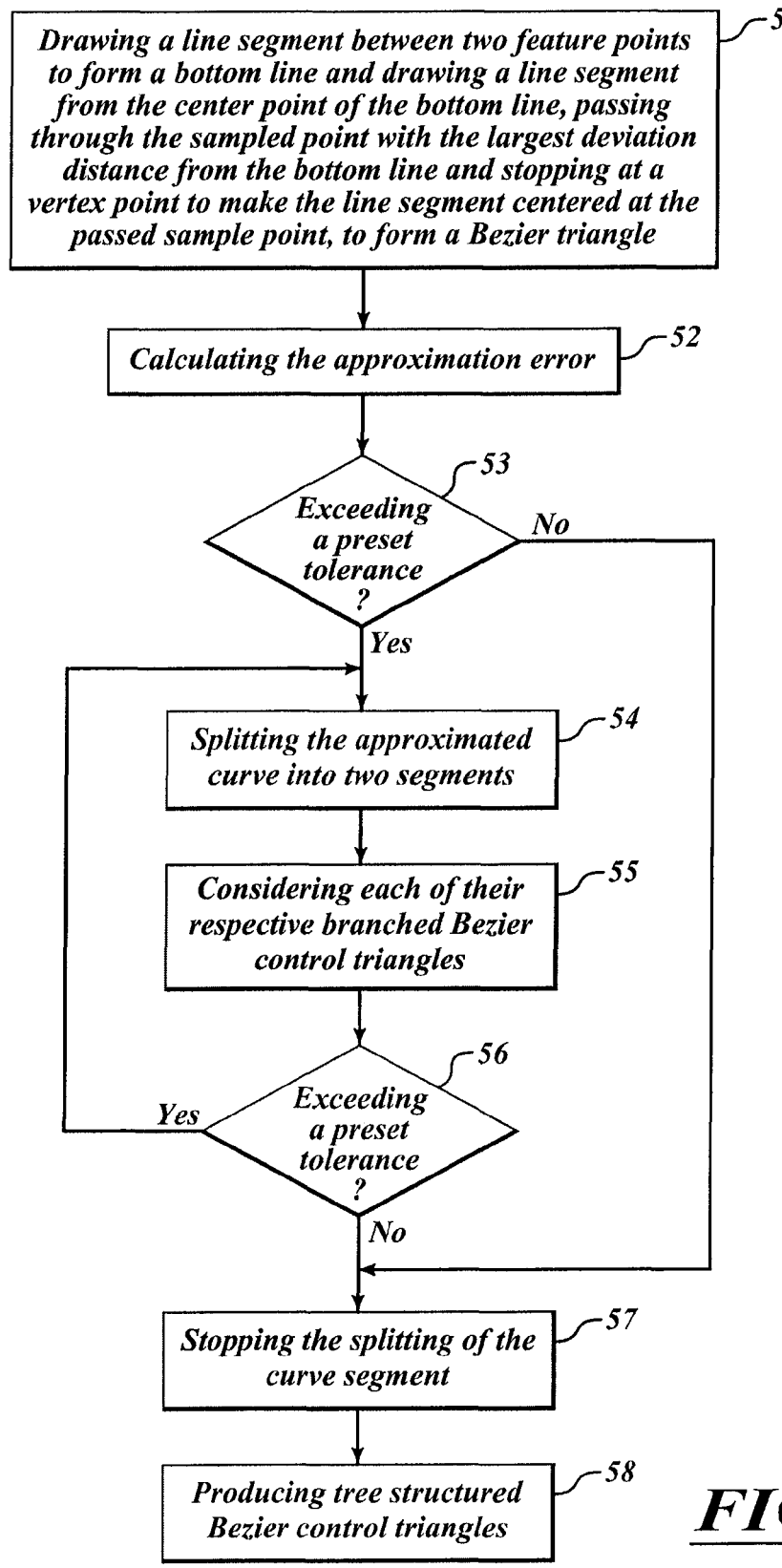
FIG. 6 is a flowchart illustrating a method of constructing approximated tree-structured Bezier curve segments that follow the moved intersecting points.

FIG. 6 is a flowchart illustrating a Bezier curve approximation procedure, which produces a target outline shape formed of tree-structured Bezier curve segments. In Block 51, the procedure starts with, for each curve segment that forms the binary dot-matrix outline shape 7, drawing a line segment between two consecutive feature points at both ends of the curve segment. Note that the locations of these two feature points remain unchanged, while the intersecting points arranged between the two features points have been moved. Then, the line connecting the two feature points forms a bottom line of a Bezier control triangle. Next, a line segment is drawn from the center point of the bottom line, passing through the moved intersecting point that has the largest deviation distance from the bottom line (which becomes a "control point"), and stopping at a vertex point such that the resulting line segment is centered at the passed "control point." Thus, a Bezier control triangle is formed to produce a binary Bezier curve, which passes through the largest-deviated moved intersecting point (the "control point C") and is tangent to two sides of the triangle at the two feature points, respectively. (See, FIG. 3B.)

In Block 52, it is determined how well the Bezier curve produced in Block 51 fits (approximates) all of the moved intersecting points between the two feature points. This determination may be made using various methods. For example, the distances between the Bezier curve to the moved intersecting points, respectively, may be calculated, and the maximum distance may be used or an average of the distances may be used as an approximation error value.

In Block 53, the approximation error value is compared against a preset tolerance value. If the error value exceeds the preset tolerance value, then in Block 54, the approximated curve is divided into two segments at the passed control point ("C" in FIG. 3B). Then, in Block 55, a further-order Bezier control triangle is formed to produce a further-order Bezier curve that approximates (follows) a sub-set of the moved intersecting points in each of the split segments based on using the same Bezier curve approximation approach. In Block 56, an approximation error value is calculated for each Bezier curve segment of the newly-defined tree-structured Bezier curve segments, and is compared against the preset tolerance value. If any of the approximation error values does not exceed the tolerance value, then the curve splitting ceases; else each Bezier curve segment whose approximation error exceeds the tolerance value continues to be split into two further segments and the Bezier curve approximation approach is repeated.

In Block 57, when it is confirmed that the newly-defined tree-structured Bezier curve segments fit (approximate) all of the moved intersecting points between the two feature points, then further splitting of any Bezier curve segment ceases. In Block 58, the final tree-structured approximated Bezier curve segments defined by corresponding tree-structured Bezier control triangles are obtained for each curve segment. If the binary dot-matrix outline shape 7 is formed of two or more curve segments, then two or more sets of the approximated Bezier curve segments are obtained. In other words, the Bezier curve approximation procedure as described in FIG. 6 is repeated for each of the one or more curve segments that form the binary dot-matrix outline shape 7, until all of the curve segments, which are now defined by the moved intersecting points, are approximately represented by a collection (of the sets) of the approximated Bezier curve segments.

Returning to FIG. 1B, in Block 27, a collection of the approximated Bezier curve segments that are produced are recorded as a gray dot-matrix outline font which, when input to a standard font engine, can display (generate) a high-quality gray dot-matrix character image on a gray dot-matrix screen. It should be apparent to one skilled in the art that, if a character consists of two or more outline shapes, then the method of FIG. 1B is repeated for each of the two or more outline shapes, respectively.

In the above, some exemplary embodiments of a method of the present invention have been described, which transforms a binary dot-matrix font to a gray dot-matrix font suited for rendering a high-quality character image on a gray dot-matrix screen. As described above, a method can be used to produce both a gray dot-matrix outline font, and a gray dot-matrix image font that is an intermediate product obtained during the transformation of a binary dot-matrix font into a gray dot-matrix outline font.

Figure 7:
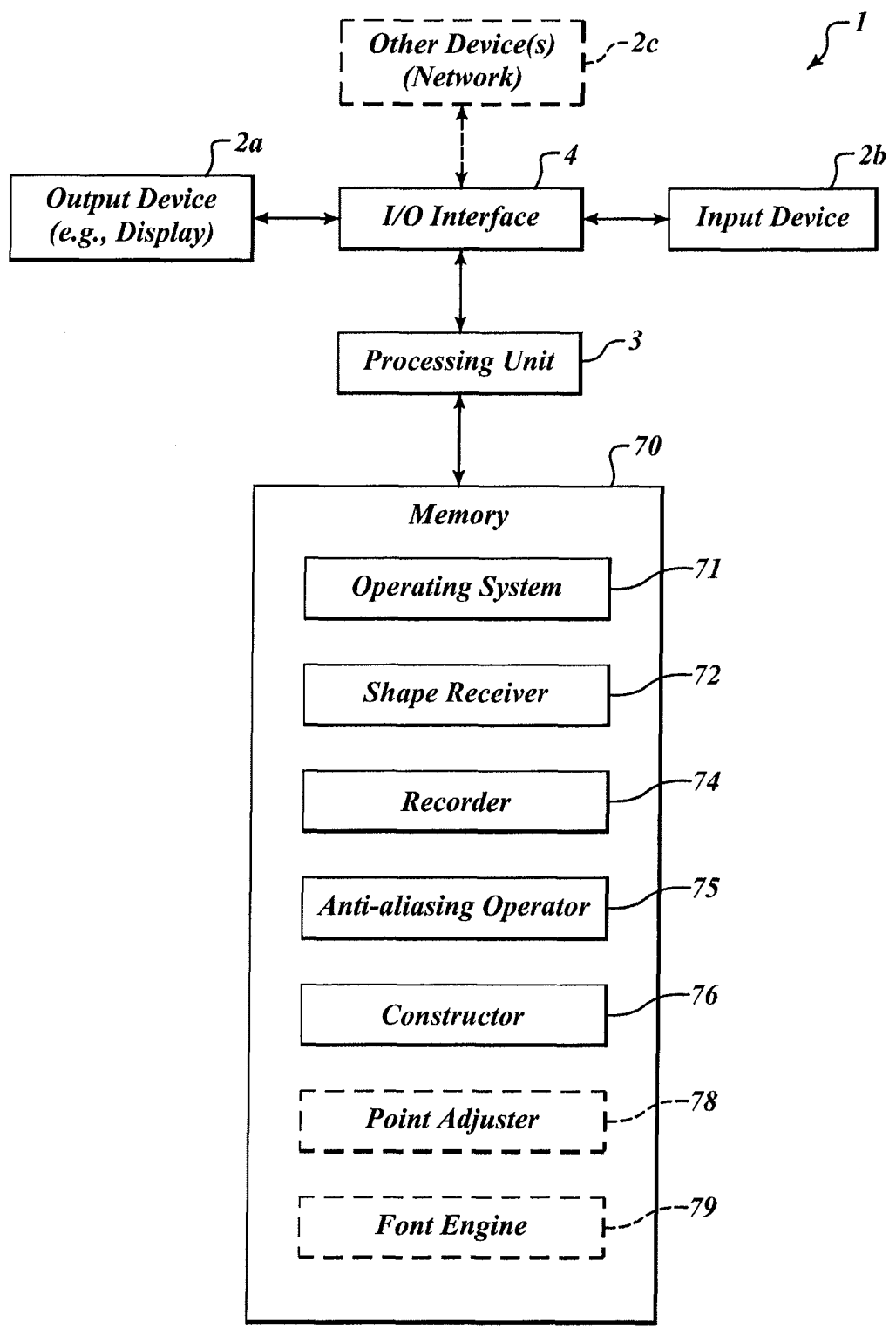
FIG. 7 is a block diagram of a system or graphical computer user interface tool product according to one embodiment of the present invention.

FIG. 7 is a block diagram of a system, or a graphical computer user interface tool product, for transforming a binary dot-matrix font into a gray dot-matrix font according to one embodiment of the present invention. The system (or the graphical computer user interface tool product) 1 may be formed of a general purpose computer as shown in FIG. 1A, and includes a processing unit 3, I/O interface 4, output device 2a (e.g., display), input device 2b (e.g., keyboard, mouse), and memory 70, which are coupled together through bus lines.

The input/output ("I/O") interface 4 is used for connecting, via a wired link or wirelessly, to other devices 2c (which may be on a network), for example, for receiving binary dot-matrix font data from another device or for transferring generated gray dot-matrix font data to another device. The I/O interface 3 includes the necessary circuitry for such a connection, and is also constructed for use with the necessary protocols. The I/O interface 4 also connects the processing unit 3 to the input device (e.g., keyboard, mouse) 2b and the output device (e.g., display) 2a.

The memory 70 generally comprises a random access memory ("RAM"), a read-only memory ("ROM"), and a permanent mass storage device, such as a disk drive, tape drive, optical drive, or combination thereof. The memory 70 includes an operating system 71, a shape receiver 72, a recorder 74, an anti-aliasing operator 75, a font constructor 76, and optionally a point adjuster 78 and a font engine. In the illustrated embodiment, each of these elements may be formed of a collection/combination of hardware and software that is designed to carry out its function(s) or routines. Specifically, the shape receiver 72 is configured to receive a binary dot-matrix outline shape. The recorder 74 constructs a lattice coordinate system in which the received binary dot-matrix outline shape is placed, on which a binary dot-matrix character image that is produced based on the received outline shape is superposed. The recorder 74 records the intersecting points between each of the curve segments of the binary dot-matrix outline shape and the lattice coordinate system. The recorder 74 also records the intersecting status (horizontal or vertical) for each of the intersecting points. The anti-aliasing operator 75 carries out an anti-aliasing operation on the binary dot-matrix outline shape to obtain a target gray value for each of the intersected dots along the binary dot-matrix outline shape. The font constructor 76 constructs a gray dot-matrix image font in the form of a collection of the target gray values for all of the intersected dots.

Optionally, the point adjuster 78 is included to move the positions of the intersecting points in the lattice coordinate system to achieve the target gray value for each of the intersected points. Then, the font constructor 76 may obtain approximated Bezier curve segments that follow the moved intersecting points, and record a collection of the approximated Bezier curve segments as a gray dot-matrix outline font.

In various exemplary embodiments of the present invention, the memory 70 also includes the font engine 79 for rendering the constructed gray dot-matrix (image or outline) font on the display 2a comprising a gray dot-matrix screen.

It will be appreciated that any software components described above may be loaded from a computer-readable medium into the memory 70 of the computing device 1 using a drive mechanism associated with the computer readable medium, such as a DVD/CD-ROM drive or a USB flash drive and/or via the I/O interface 4.

It should be apparent to those skilled in the art that the configuration of a system of the present invention is not limited to what is illustrated in FIG. 7, and various other configurations are possible. For example, some of the functions performed by various elements (or components) of the system 1 may be combined to be performed by a single element; and a function or routine performed by a single element may be divided to be performed by multiple elements in a distributed manner. FIG. 7 depicts only several of the key elements (components) of a system (or a computing device) 1 suitable for transforming a binary dot-matrix font to a gray dot-matrix font, and the system 1 may include many more elements (components) than those shown in FIG. 7.

While a method of transforming a binary dot-matrix font to a gray dot-matrix font may be carried out fully automatically as described above, some human intervention may be allowed in some applications. For example, human intervention may be desired to eliminate certain errors, to select suitable weights for each of the Gaussian operators to be used, or to formulate an equation that defines a covered area of each intersected dot. Accordingly, in some embodiments of the present invention, a computer-readable medium containing a computer graphical user interface software tool is provided for transforming a binary dot-matrix font to a gray dot-matrix font, wherein some user intervention is allowed to facilitate the transformation process. In other words, the transformation process may be carried out semi-automatically in these embodiments.

Figure 8:
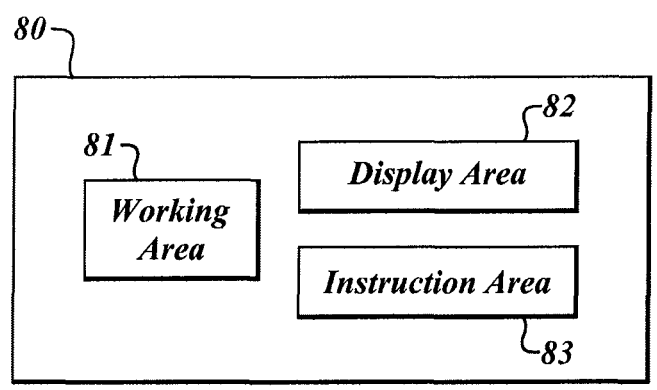
FIG. 8 is a screen shot of a sample display of the graphical computer user interface tool product according to one embodiment of the present invention.

FIG. 8 is a screen shot of a sample display of the graphical computer user interface software tool according to one embodiment of the present invention. A screen 80 contains a working area 81, a display area 82, and an instruction area 83. The working area 81 is configured to display a binary dot-matrix character image on a lattice coordinate system, on which a corresponding binary dot-matrix outline shape is superposed. The working area 81 may be further configured to display a Gaussian operator (e.g., a 3×3 weights matrix, see FIG. 4A) to be applied to each intersected dot along the binary dot-matrix outline shape, as well as its associated rules (e.g., to what type of topography of intersected dot the Gaussian operator should be applied). The working area 81 may still further be configured to display the moved intersecting points in the lattice coordinate system as well as a Bezier control point for each of the approximated Bezier curve segments that follow the moved intersecting points.

The instruction area 83 is configured to receive and/or display a user instruction to modify the information displayed in the working area 81. A user instruction may be received via any suitable input device 2b (see FIG. 1A), including a touch screen that may be used to form the instruction area 83 that the user can directly touch.

The instruction area 83 can receive specific weights to be assigned to form a Gaussian operator, or rules to be associated with each Gaussian operator. As other examples, the instruction area 83 may receive a user instruction as to which particular Gaussian operator should be applied to each intersected dot.

The display area 82 is configured to display a gray dot-matrix character image that results from the information displayed in the working area 81, which may be modified by the user based on user instructions entered via the instruction area 83. The gray dot-matrix character image is produced by any suitable font engine 79, which is included in the memory 70 of the computing system 1.

For example, when a user defines or modifies a Gaussian operator or specifies a particular Gaussian operator to be applied to a particular intersected dot, through the instruction area 83, then an anti-aliasing algorithm applies the user-specified Gaussian operator to the selected intersected dot. Then, the resulting gray dot-matrix character image is displayed in the display area 82 either automatically or based on the user's command. Thus, the user can visually confirm a desired anti-aliasing effect.

As another example, a user may select (e.g., click on) an icon in the working area 81, to indicate that he wishes to manually adjust the location of a moved intersecting point to achieve a desired anti-aliasing effect. In response to such a selection, the working area 1 displays the moved intersecting points on the lattice coordinate system (if not already). The user may then be allowed to manually adjust the location of any of the moved intersecting points by, for example, clicking on and dragging the moved intersecting point to a new location. In this embodiment, the working area 81 additionally functions as the instruction area 83. Alternatively, the user may be allowed to select a particular moved intersecting point in the working area 81 and to numerically specify, in the instruction area 83, the X-Y coordinates of the new position to which the intersecting point is to be moved in the lattice coordinate system.

Then, a resulting gray dot-matrix character image may be displayed in the display area 82 such that the user can visually confirm a desired anti-aliasing effect after the user manually adjusts any moved intersecting point.

As a further example, the working area 1 may display a Bezier curve control point for each of the approximated Bezier curve segments that follow the moved intersecting points, and the user may be permitted to move the location of the Bezier curve control point to fine-tune the resulting gray dot-matrix character image as displayed in the display area 82. In this case, the user may click on and drag the control point in the working area 81, or may numerically specify the X-Y coordinates of the new position of the control point in the instruction area 83.

As yet another example, the user may modify an approximation error tolerance value used in a Bezier curve approximation procedure (see Block 53 in FIG. 6), which is used to set how closely each approximated Bezier curve segment must follow (or fit to) the moved intersecting points. The user may enter a desired tolerance value in the instruction area 83.

With the addition of the user-interface software tool described above, various intermediate data can be recorded as well as the final data. For example, the display area 82 may be configured to display a resulting gray dot-matrix character image in low to high resolutions (e.g., 16×16 dot-matrix for each character, to 48×48 dot-matrix for each character). Then, a user (a font designer) may define a scalable gray dot-matrix font suitable for rendering a gray dot-matrix character image in varying resolutions, or may define different gray dot-matrix fonts for use in different resolutions, respectively, by recording various intermediate data.

Various embodiments described above can be combined to provide further embodiments. All of the U.S. patents referred to in this specification are incorporated herein by reference, in their entirety. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of transforming a binary dot-matrix font to a gray dot-matrix font on a computer including one or more processors, a memory device, a display screen, and a user input device, the method comprising:
   (a) receiving in the memory device a binary dot-matrix outline shape that is designed to render a binary dot-matrix character image on a binary dot-matrix display, the binary dot-matrix outline shape comprising one or more curve segments;
   (b) the one or more processors placing the received dot-matrix outline shape and the binary dot-matrix character image based thereon on a lattice coordinate system composed of a plurality of dots in the memory device;
   (c) for each of the one or more curve segments, the one or more processors recording in the memory device intersecting points between the curve segment and the plurality of dots in the lattice coordinate system, wherein the intersecting points are locations on horizontal and vertical sides of the dots that are intersected by the one or more curve segments;
   (d) the one or more processors performing an anti-aliasing operation on the binary dot-matrix outline shape placed on the lattice coordinate system in the memory device to obtain a target gray value for each of the intersected dots;
   (e) the one or more processors recording in the memory device the target gray value as part of a collection of target gray values for all of the intersected dots, respectively, as a gray dot-matrix image font; and
   (f) the one or more processors moving the intersecting points in the lattice coordinate system in the memory device to achieve the target gray value for each of the intersected dots obtained in step (d), by (i) formulating an equation that defines a covered area for each of the intersected dots on the right-hand side of the equation and entering the target gray value for the intersected dot on the left-hand side of the equation, and (ii) solving equations for all of the intersected dots, formulated in (i) above, simultaneously using a least square solution to obtain moved intersecting points for all of the intersected dots, respectively;
   wherein step (d) includes the one or more processors performing an anti-aliasing operation by applying a Gaussian operator consisting of a matrix of weights to each of the intersected dots and dots that surround said intersected dot, respectively, the matrix of weights being selected based on the topography of the intersecting points on said intersected dot; and
   wherein step (f) further formulates the equations for all of the intersected dots such that moved horizontal and moved vertical intersecting points remain horizontal and vertical intersecting points, respectively.

2. The method of claim 1, wherein the binary dot-matrix outline shape is provided by a binary dot-matrix outline font which, when input to a font engine, generates a binary dot-matrix character image on a binary dot-matrix display.

3. The method of claim 1, wherein step (f) includes, for each of the intersected dots,
- (g) the one or more processors obtaining approximated Bezier curve segments that follow the moved intersecting points; and
- (h) the one or more processors recording in the memory device a collection of the approximated Bezier curve segments obtained in step (g) as a gray dot-matrix outline font.

4. A non-transitory tangible computer-readable medium containing computer-executable instructions which, when loaded onto a computing system, carry out functions comprising:
- a receiver function of receiving a binary dot-matrix outline shape that is designed to render a binary dot-matrix character image on a binary dot-matrix display, the binary dot-matrix outline shape comprising one or more curve segments;
- a recorder function of placing the received dot-matrix outline shape and the binary dot-matrix character image based thereon on a lattice coordinate system composed of a plurality of dots and, for each of the one or more curve segments, recording intersecting points between the curve segment and the plurality of dots in the lattice coordinate system, wherein the intersecting points are locations on horizontal and vertical sides of the dots that are intersected by the one or more curve segments;
- an anti-aliasing operator function to perform an anti-aliasing operation on the binary dot-matrix outline shape placed on the lattice coordinate system to obtain a target gray value for each of the intersected dots;
- a point adjuster function of moving the intersecting points in the lattice coordinate system to achieve the target gray value for each of the intersected dots, by (i) formulating an equation that defines a covered area for each of the intersected dots on the right-hand side of the equation and entering the target gray value for the intersected dot on the left-hand side of the equation, and (ii) solving equations for all of the intersected dots, formulated in (i) above, simultaneously using a least square solution to obtain moved intersecting points for all of the intersected dots, respectively; and
- a gray dot-matrix image font constructor function to record the target gray value as part of a collection of target gray values for all of the intersected dots, respectively, as a gray dot-matrix image font;
- wherein said anti-aliasing operation function performs an anti-aliasing operation by applying a Gaussian operator consisting of a matrix of weights to each of the intersected dots and dots that surround said intersected dot, respectively, the matrix of weights being selected based on the topography of the intersecting points on said intersected dot; and
- wherein said point adjuster function further formulates the equations for all of the intersected dots such that moved horizontal and moved vertical intersecting points remain horizontal and vertical intersecting points, respectively.

5. The medium of claim 4, wherein the computer-executable instructions carry out further functions comprising:
- a gray dot-matrix outline font constructor function to obtain approximated Bezier curve segments that follow the moved intersecting points, and to record a collection of the approximated Bezier curve segments as a gray dot-matrix outline font.

6. A non-transitory tangible computer-readable medium containing a computer graphical user interface software tool for transforming a binary dot-matrix font to a gray dot-matrix font, comprising computer-executable instructions which, when loaded onto a computing system including a processor, a memory device, an input device, and an output device comprising a display, carry out functions comprising:
- (a) displaying on the display of the computing system a working area, a display area, and an instruction area, wherein,
  - (i) the working area is configured to display a binary dot-matrix character image on a lattice coordinate system composed of a plurality of dots, and to further display a corresponding binary dot-matrix outline shape as overlaid on the binary dot-matrix character image, the binary dot-matrix outline shape comprising one or more curve segments that form intersecting points with the plurality of dots in the lattice coordinate system;
  - (ii) the instruction area is configured to receive a user instruction to modify information displayed in the working area;
  - (iii) the display area is configured to display a gray dot-matrix character image that results from the information displayed in the working area and modified by a user;
- (b) recording in the memory device of the computing system, for each of the one or more curve segments forming the binary dot-matrix outline shape as displayed in the working area, intersecting points between the curve segment and the plurality of dots in the lattice coordinate system, wherein the intersecting points are locations on horizontal and vertical sides of the dots that are intersected by the one or more curve segments;
- (c) performing an anti-aliasing operation on the binary dot-matrix outline shape placed in the lattice coordinate system in the working area to obtain a target gray value for each of the intersected dots, by applying a Gaussian operator consisting of a matrix of weights to each of the intersected dots and dots that surround said intersected dot, respectively, the matrix of weights being selected based on the topography of the intersecting points on said intersected dot;
- (d) recording in the memory device the target gray value as part of a collection of target gray values for all of the intersected dots, respectively, as a gray dot-matrix image font; and
- (e) moving the intersecting points in the lattice coordinate system to achieve the target gray value for each of the intersected dots, by (i) formulating an equation that defines a covered area for each of the intersected dots on the right-hand side of the equation and entering the target gray value for the intersected dot on the left-hand side of the equation, and (ii) solving equations for all of the intersected dots, formulated in (i) above, simultaneously using a least square solution to obtain moved intersecting points for all of the intersected dots, respectively;
- wherein step (e) further formulates the equations for all of the intersected dots such that moved horizontal and moved vertical intersecting points remain horizontal and vertical intersecting points, respectively.

7. The medium of claim 6, wherein the computer-executable instructions carry out a further function of obtaining approximated Bezier curve segments that follow the moved intersecting points.

8. The medium of claim 7, wherein the working area is further configured to display the moved intersecting points in the lattice coordinate system as well as a Bezier curve control point for each of the approximated Bezier curve segments that are fitted to the moved intersecting points.

9. The medium of claim 8, wherein the computer-executable instructions carry out a further function of receiving a user instruction to move the Bezier curve control point as displayed in the working area via the input device, and the display area is further configured to display a gray dot-matrix character image that results from the moved Bezier curve control point.

10. The medium of claim 7, wherein the computer-executable instructions carry out a further function of receiving a user instruction to define an error tolerance value used by the processor to obtain approximated Bezier curve segments that follow the moved intersecting points.

11. The medium of claim 7, wherein the computer-executable instructions carry out a further function of recording in the memory device a collection of the approximated Bezier curve segments as a gray dot-matrix outline font.

12. The medium of claim 6, wherein the computer-executable instructions carry out a further function of receiving a user instruction to define the Gaussian operator via the input device, to be used in the anti-aliasing operation on the binary dot-matrix outline shape placed on the lattice coordinate system, and the display area is further configured to display a gray dot-matrix character image that results from the anti-aliasing operation based on the Gaussian operator defined by the user.

\* \* \* \* \*